Sept. 8, 1925.
H. C. McCALL
POWER GENERATOR
Filed July 17, 1923
1,552,716
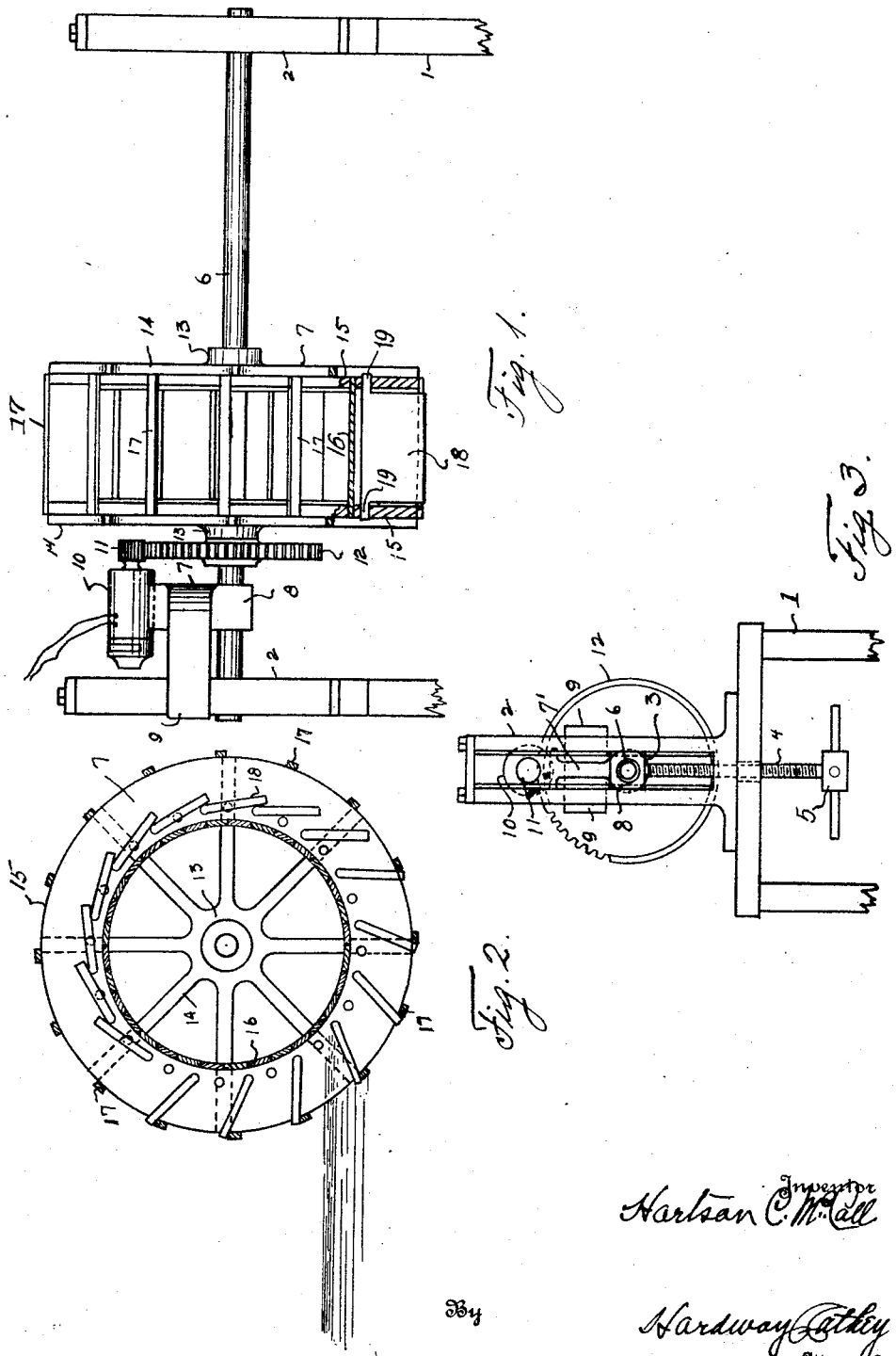

Patented Sept. 8, 1925.

1,552,716

UNITED STATES PATENT OFFICE.

HARTSON C. McCALL, OF HOUSTON, TEXAS.

POWER GENERATOR.

Application filed July 17, 1923. Serial No. 652,060.

*To all whom it may concern:*

Be it known that I, HARTSON C. MCCALL, a citizen of the United States, residing at Houston, in the county of Harris and State of Texas, have invented certain new and useful Improvements in a Power Generator, of which the following is a specification.

This invention relates to new and useful improvements in a power generator, and has particular relation to a power generator embodying a novel type of breast water wheel.

One object of the invention is to provide a water wheel of the breast type which is rotated by the impulse of flowing water assisted by the weight of the water in the buckets.

Another object of the invention is to provide a water wheel for generating power which is adjustable vertically so as to accommodate it to the rise or fall of the stream of water.

A further feature of the invention resides in the provision of a power generator of this character, in combination with an electric generator through which having extensions 19 and which the power generated may be converted into an electric current for general use.

With the above and other objects in view the invention has particular relation to certain novel features of construction, operation and arrangement of parts, an example of which is given in this specification and illustrated in the accompanying drawings, wherein:

Figure 1 is a front elevation of the device shown partly in section.

Figure 2 shows a side view of the water wheel, and,

Figure 3 shows a side view of the adjusting mechanism.

In the drawings the numerals 1, 1, designate suitable supporting frames which are located on opposite sides of the stream of water, and fastened to these frames and upstanding therefrom, are the respective tracks 2, 2, in which the bearings, as 3, are mounted to move vertically. Each bearing has a swiveling connection with the upper end of the corresponding outwardly threaded adjusting rod 4, which is threaded through the upper part of the corresponding frame work, and whose lower end has a windlass, as 5, fixed thereon, or other suitable means through which the adjusting rod may be turned to move the bearing 3 up or down. Rotatably mounted in these bearings there is a shaft 6, and fixed on this shaft there is the breast water wheel 7 which may be made of one or more sections, as indicated in Figure 1, depending on the amount of power required. The numeral 7' designates a bracket which is formd with a bearing 8 in which the shaft 6 works. This bracket stands up above said shaft, and has the clamp arms 9, 9, which embrace the corresponding track 2, to prevent the bracket from turning. This bracket carries a suitable electric generator as 10, of conventional construction whose shaft carries a spur pinion 11 which is in mesh with the spur gear 12 which is fixed on the shaft 6.

The water wheel has the central hubs 13, 13, with spokes as 14 radiating therefrom. The outer ends of the spokes 14 of the respective hubs, have the annular side walls as 15, 15, secured thereto on their inner sides which, together with the annular transverse wall 16, form a peripheral channel around the wheel. The outer edges of the side walls 15 are braced by suitable cross braces as 17. The channel has a plurality of partitions 18 spaced apart therein which are pivoted at their inner edges between the side walls 15, adjacent the bottom wall 16. As the wheel rotates these partitions drop outwardly on the front side of the wheel, their outer edges resting on the corresponding braces 17, forming buckets which are filled by the advancing current of water. The impulse of the water, assisted by the weight thereof in the buckets causes the wheel to rotate. As the partitions emerge from the water on the rear side of the wheel they drop into vertical or collapsed position as illustrated in Figure 2, thus carrying their weight nearer to the center of the wheel, and lessening the load of their weight.

As before stated, the water wheel may be elevated or lowered as required, and the power thus varied, and this adjustment will be particularly desirable when the water rises or falls in the channel.

What I claim is:

1. In combination a pair of spaced supports, vertically movable bearings therein, a shaft mounted to rotate in said bearings, means for adjusting said bearings vertically, a bracket mounted on the shaft and movable vertically therewith, arms carried by the bracket and embracing one of said supports, a driven mechanism carried by said bracket and operatively connected with, and driven from, said water wheel.

2. A water wheel having annular side walls and a transverse wall forming an annular peripheral channel, spaced partitions therein whose inner edges are pivoted to the side walls near the bottom of the channel, and whose outer ends are free, said partitions being movable into extended, or collapsed position, all in combination with spaced supports, a shaft rotatable in said supports and on which the wheel is fixed, a supporting bracket mounted on the shaft and having a sliding connection with one of said supports and means for adjusting the shaft vertically on the supports.

3. In combination a pair of supports, vertically adjustable bearings carried thereby, means for adjusting said bearings vertically, a shaft in said bearings, a water wheel fixed on said shaft, a bracket carried by the shaft and having a sliding connection with one of said supports, and being held in constant relation to the shaft thereby, a driven mechanism on the bracket in operative connection with the shaft.

In testimony whereof I have signed my name to this specification.

HARTSON C. McCALL.